United States Patent
Schlude et al.

(10) Patent No.: US 10,866,629 B2
(45) Date of Patent: Dec. 15, 2020

(54) POWER CONTROL FOR COMPUTER SYSTEMS WITH MULTIPLE POWER SUPPLIES

(71) Applicant: LENOVO ENTERPRISE SOLUTIONS (SINGAPORE) PTE. LTD., Singapore (SG)

(72) Inventors: Timothy J. Schlude, Apex, NC (US); Warren D. Bailey, Pittsboro, NC (US); Ritu Bhatia, Morrisville, NC (US); Michael D. French, Jr., Apex, NC (US); Donald N. Tingen, Mebane, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 199 days.

(21) Appl. No.: 15/983,419

(22) Filed: May 18, 2018

(65) Prior Publication Data
US 2019/0354164 A1   Nov. 21, 2019

(51) Int. Cl.
*G06F 1/26*   (2006.01)
*G06F 1/3296*   (2019.01)
*G06F 1/3206*   (2019.01)

(52) U.S. Cl.
CPC .......... *G06F 1/3296* (2013.01); *G06F 1/3206* (2013.01)

(58) Field of Classification Search
CPC ............................... G06F 1/263; G06F 1/3206
See application file for complete search history.

(56) References Cited

U.S. PATENT DOCUMENTS 7,312,962 B1 * 12/2007 Zansky ................. H02H 3/087
  361/18
2017/0168535 A1 * 6/2017 Ragupathi ................ G06F 1/28

* cited by examiner

*Primary Examiner* — Albert Wang

(57) ABSTRACT

Power control for computer systems with multiple power supplies including receiving a first measurement of power supplied to a computer system by a first power supply; receiving a second measurement of power supplied to the computer system by a second power supply; calculating a total power supplied to the computer system by combining the first measurement of power supplied to the computer system by the first power supply and the second measurement of power supplied to the computer system by the second power supply; comparing the total power supplied to the computer system to a power threshold of the computer system; and in response to determining that the total power supplied exceeds the power threshold of the computer system, shutting off the first power supply.

20 Claims, 7 Drawing Sheets

US 10,866,629 B2

POWER CONTROL FOR COMPUTER SYSTEMS WITH MULTIPLE POWER SUPPLIES

BACKGROUND

Field of the Invention

The field of the invention is data processing, or, more specifically, methods, apparatus, and products for power control for computer systems with multiple power supplies.

Description Of Related Art

Components within a computer system may be damaged if too much power is provided to that system. A single power supply that supplies power to the computer system may monitor the power supplied to the computer system. Through this monitoring, the power supply may be able to limit or prevent damage to the computer system from power oversupply. Some computer systems support multiple power supplies for increased system power delivery, redundancy, reliability and efficiency. However, the use of multiple power supplies may limit the ability of each power supply to prevent damage to the computer system from power oversupply.

SUMMARY

Methods, systems, and apparatus for power control for computer systems with multiple power supplies are disclosed in this specification. Power control for computer systems with multiple power supplies includes receiving a first measurement of power supplied to a computer system by a first power supply; receiving a second measurement of power supplied to the computer system by a second power supply; calculating a total power supplied to the computer system by combining the first measurement of power supplied to the computer system by the first power supply and the second measurement of power supplied to the computer system by the second power supply; comparing the total power supplied to the computer system to a power threshold of the computer system, wherein the power threshold of the computer system is a maximum amount of power the computer system draws before damage to the computer system occurs; and in response to determining that the total power supplied exceeds the power threshold of the computer system, shutting off the first power supply.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
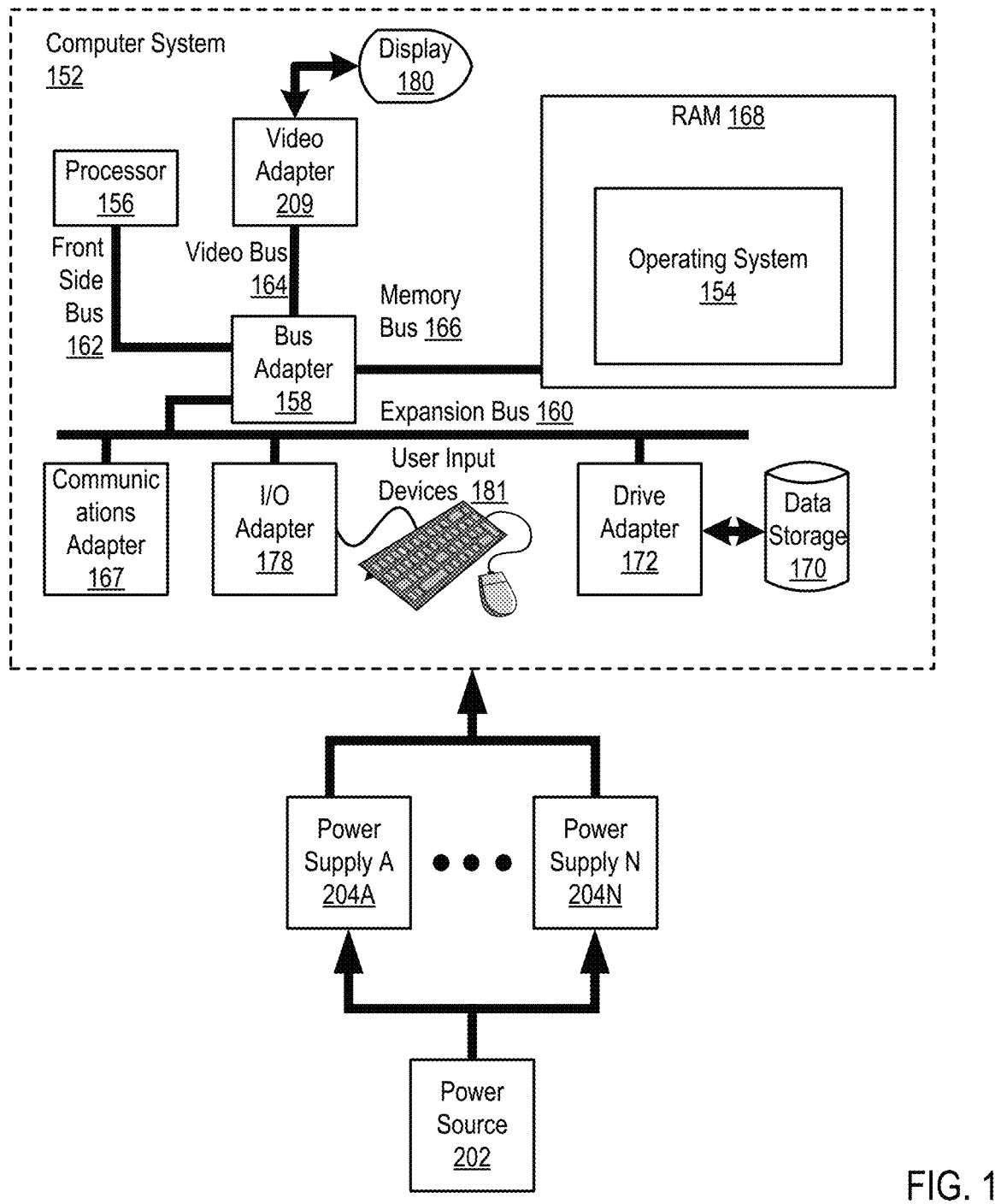
FIG. 1 sets forth a block diagram of an example system configured for power control for computer systems with multiple power supplies according to embodiments of the present invention.

Exemplary methods, apparatus, and products for power control for computer systems with multiple power supplies in accordance with the present invention are described with reference to the accompanying drawings, beginning with FIG. 1. FIG. 1 sets forth a block diagram of automated computing machinery comprising an exemplary computing system (152), power supplies (power supply A (204A), power supply N (204N)) and a power source (202) configured for power control for computer systems with multiple power supplies according to embodiments of the present invention. The power source (202) supplies power to multiple power supplies (power supply A (204A), power supply N (204N)). The computer system (152) draws power from both power supplies. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for power control for computer systems with multiple power supplies according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for power control for computer systems with multiple power supplies according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for power control for computer systems with multiple power supplies according to embodiments of the present invention include modems for wired dial-up communications, Ethernet (IEEE 802.3) adapters for wired data communications, and 802.11 adapters for wireless data communications.

Figure 2:
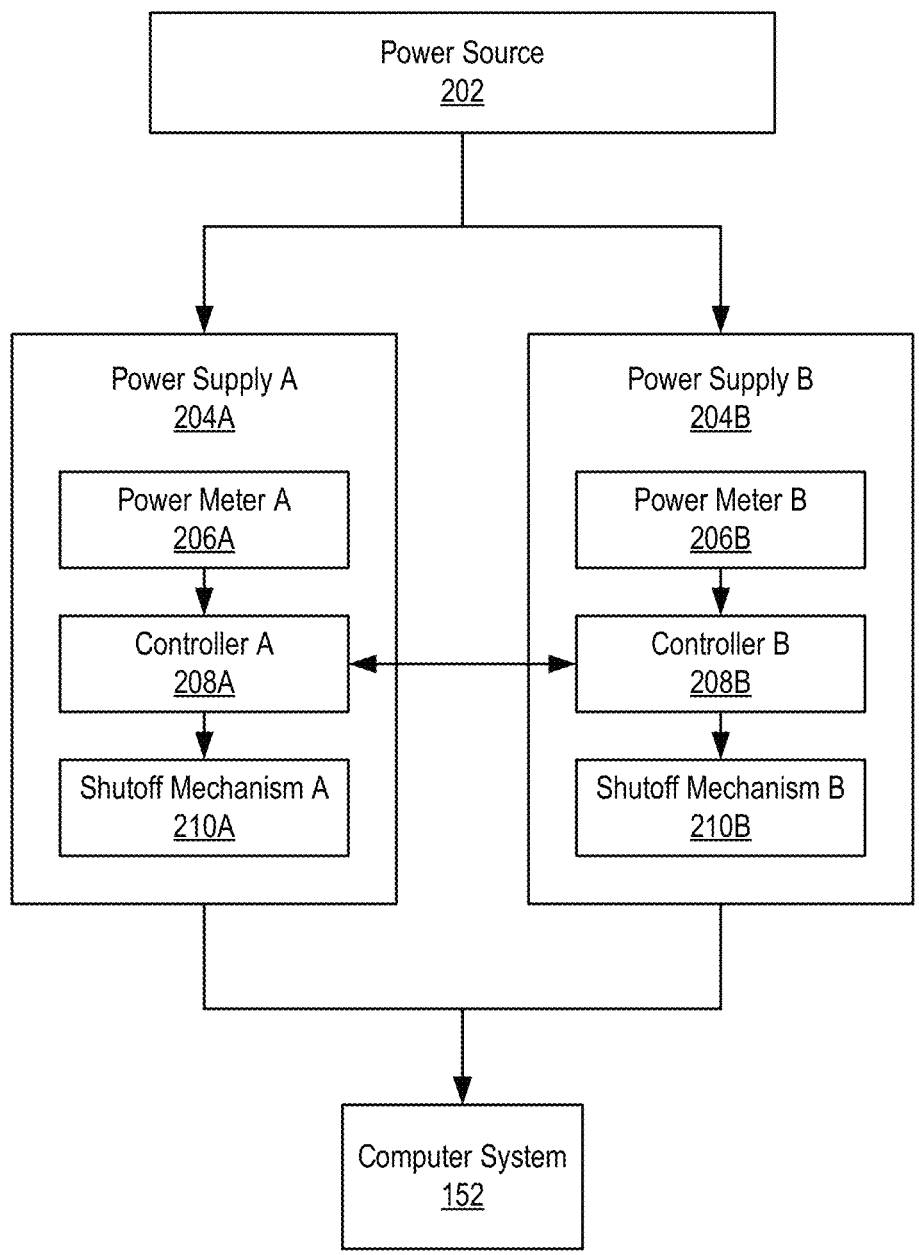
FIG. 2 sets forth a block diagram of an example system configured for power control for computer systems with multiple power supplies according to embodiments of the present invention.

FIG. 2 shows an exemplary system for power control for computer systems with multiple power supplies according to embodiments of the present invention. As shown in FIG. 2, the exemplary system includes a power source (202) supplying power to power supply A (204A) and power supply B (204B). In turn, power supply A (204A) and power supply B (204B) supply power to the computer system (152). Each power supply (power supply A (204A), power supply B (204B)) includes a power meter (power meter A (206A), power meter B (206B)), controller (controller A (208A), controller B (208B)), and a shutoff mechanism (shutoff mechanism A (210A), shutoff mechanism B (210B)).

The power source (202) provides power to the power supplies (power supply A (204A), power supply B (204B)). The power source (202) may deliver power in a voltage, current, and frequency that is unsuitable for the computer system (152) directly. The power source may be, for example, a primary alternating current power supply of a building.

The power supplies (power supply A (204A), power supply B (204B)) are devices that provide electrical power to the computer system (152). The power supplies (power supply A (204A), power supply B (204B)) convert electric current from the power source (202) to an appropriate voltage, current, and frequency for the computer system (152).

The computer system (152) may require multiple power supplies (power supply A (204A), power supply B (204B)) if the computer system (152) needs an amount of power greater than a single power supply is able to provide. For example, during a heavy workload, a computer system (152) may require 900 watts of power. Each power supply (power supply A (204A), power supply B (204B)) may be capable of providing a maximum of 500 watts of power. Therefore, during the heavy workload, the two power supplies each provide 450 watts of power (or another combination of wattages) for a combination of 900 watts of power.

The computer system (152) may be associated with a power threshold. The power threshold of the computer system is the maximum amount of power the computer system draws before damage to the computer system occurs. Damage that may occur to the computer system includes melted wires, shorted electronic components, and printed circuit board damage. The computer system (152) may cease to operate immediately or cease to operate normally after only a very short period (e.g., a few microseconds) of drawing an amount of power that exceeds the power threshold of the computer system.

Each power supply (power supply A (204A), power supply B (204B)) may also be associated with a power threshold. The power threshold of the power supply is the maximum amount of power the power supply draws from the power source before damage to the power supply occurs. Damage that may occur to the power supply includes melted wires, shorted electronic components, and printed circuit board damage. A power supply may cease to operate immediately or cease to operate normally after only a very short period (e.g., a few microseconds) of drawing an amount of power that exceeds the power threshold of the power supply.

The power meters (power meter A (206A), power meter B (206B)) are circuitry within each power supply (power supply A (204A), power supply B (204B)) that measures the current power supplied to the computer system (152) by the power supply. The power meters may also send (or otherwise provide) the measurements to a controller. For example, assume that power supply A (204A) is supplying 300 watts of power to the computer system (152). Power meter A (206) may measure the 300 watts of power supplied to the computer system (152) and send that measurement to controller A (208).

The controllers (controller A (208A), controller B (208B)) are circuitry that receive the measurements of the current power supplied to the computer system (152) by multiple power supplies and take action (if necessary) based on the measurements. Each controller (controller A (208A), controller B (208B)) may include measurement retrieval logic, comparison logic, communication logic, and shutoff logic. The measurement retrieval logic is logic within the controller that receives the measurements of power supplied to the computer system by each power supply. The measurement retrieval logic may retrieve the measurement directly from a power meter or indirectly via a controller on another power supply.

The comparison logic is logic within the controller (controller A (208A), controller B (208B)) that calculates a total power supplied to the computer system (152) by each power supply supplying power to the computer system based on the measurements received by the measurement retrieval logic. The comparison logic also receives a power threshold of the computer system which is the maximum amount of power the computer system may draw before damage occurs. Finally, the comparison logic compares the total power supplied to the power threshold and initiates an action if the power threshold is exceeded by the total power supplied.

The communication logic is logic within the controller (controller A (208A), controller B (208B)) that communicates with other controllers to retrieve the measurement of power supplied to the computer system by other power supplies. The communication logic may also communicate instructions to other controllers instructing the other controllers to shutoff the power supplies upon which the other controllers reside.

The shutoff logic is logic within the controller (controller A (208A), controller B (208B)) that communicates with a shutoff mechanism (shutoff mechanism A (210A), shutoff mechanism B (210B)) to initiate a shutdown of the power supply (power supply A (204A), power supply B (204B)). The shutoff logic may send a signal to one or more shutoff mechanisms in response to the comparison logic determining that the power threshold has been exceeded by the total power supplied to the computer system (152).

The shutoff mechanisms (shutoff mechanism A (210A), shutoff mechanism B (210B)) are circuitry within each power supply (power supply A (204A), power supply B (204B)) that receives a signal from a controller (controller A (208A), controller B (208B)) and, in response, shuts down the power supply. Shutting down the power supply includes reducing or eliminating the power supplied by the power supply to the computer system (152). Each shutoff mechanism may include a switch that, when toggled, stops power being sent to the computer system by the power supply.

Figure 3:
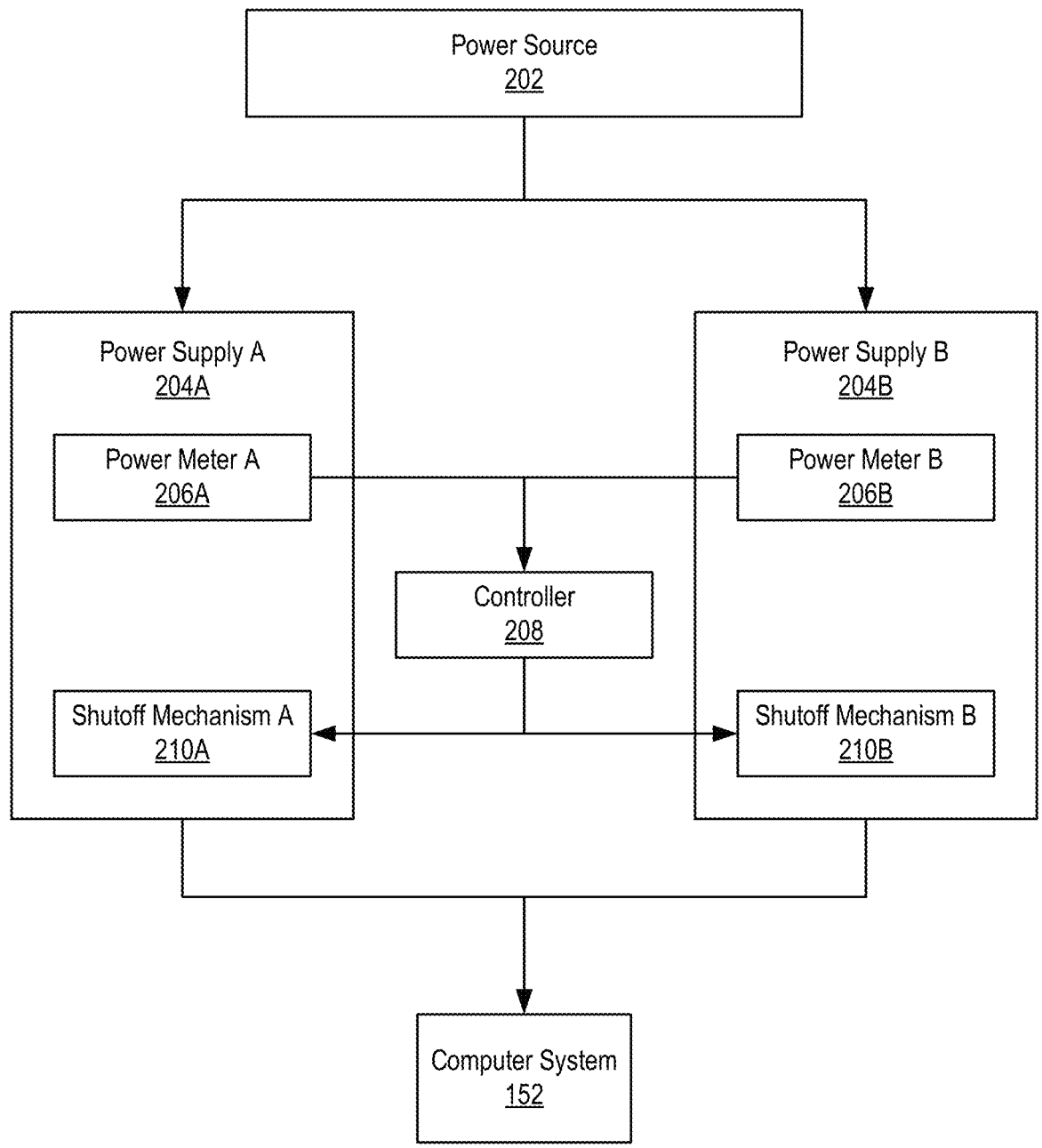
FIG. 3 sets forth a block diagram of an example system configured for power control for computer systems with multiple power supplies according to embodiments of the present invention.

FIG. 3 shows an exemplary system for power control for computer systems with multiple power supplies according to embodiments of the present invention. Like FIG. 2, the exemplary system of FIG. 3 includes a power source (202) supplying power to power supply A (204A) and power supply B (204B). Power supply A (204A) and power supply B (204B) supply power to the computer system (152). Also as in FIG. 2, each power supply (power supply A (204A), power supply B (204B)) in FIG. 3 includes a power meter (power meter A (206A), power meter B (206B)) and a shutoff mechanism (shutoff mechanism A (210A), shutoff mechanism B (210B)).

However, in contrast to the exemplary system in FIG. 2, the system in FIG. 3 includes a single controller (208) external to the power supplies (power supply A (204A), power supply B (204B)) and directly coupled to the power meters (power meter A (206A), power meter B (206B)) and shutoff mechanisms (shutoff mechanism A (210A), shutoff mechanism B (210B)) of each power supply. The controller (208) may operate from a separate housing to that of the power supplies and computer system. Alternatively, the controller (208) may be housed in the computer system (152) or within one of the power supplies.

Figure 4:
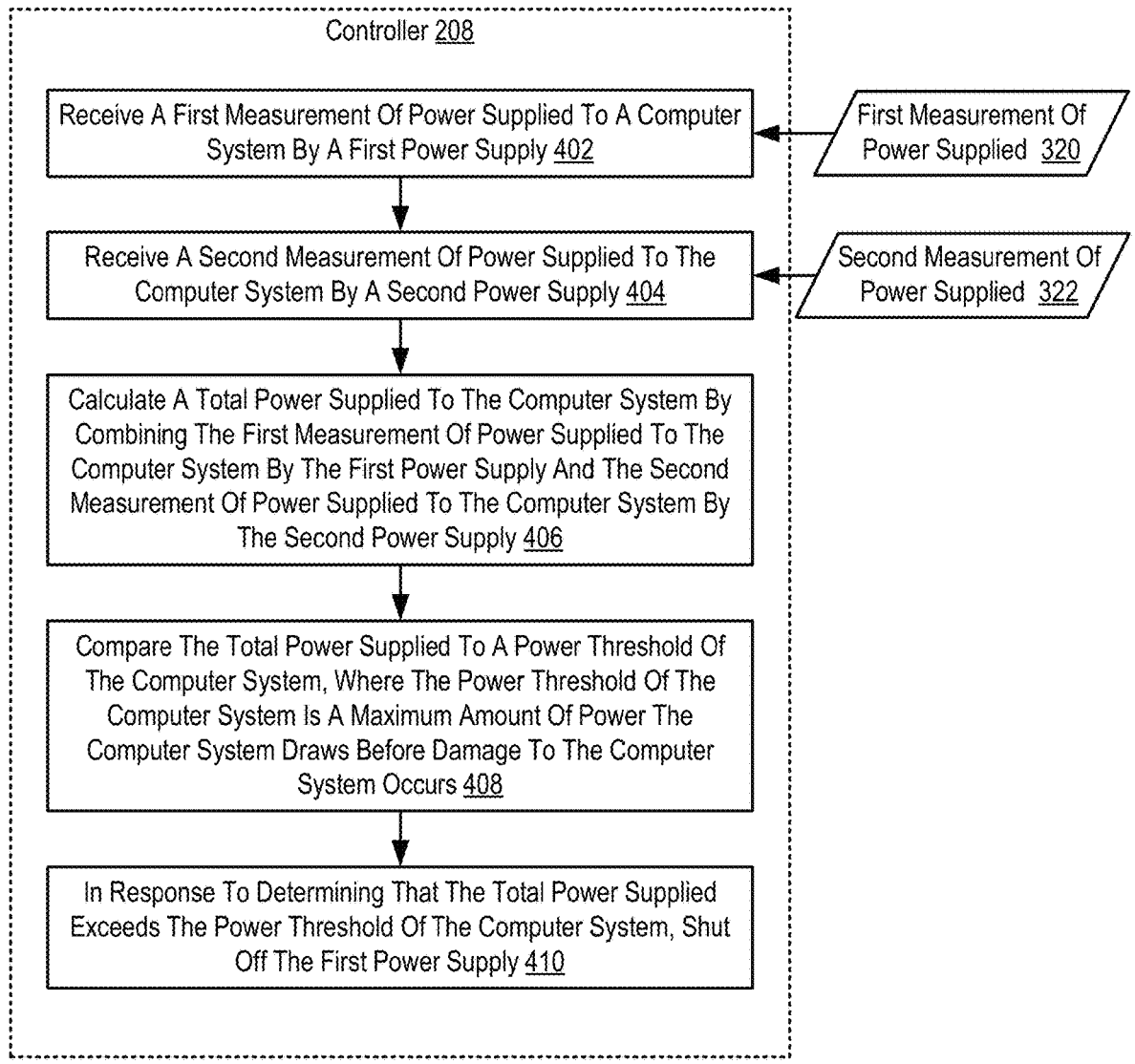
FIG. 4 sets forth a flow chart illustrating an exemplary method for power control for computer systems with multiple power supplies according to embodiments of the present invention.

For further explanation, FIG. 4 sets forth a flow chart illustrating an exemplary method for power control for computer systems with multiple power supplies according to embodiments of the present invention that includes receiving (402) a first measurement (320) of power supplied to a computer system by a first power supply. Receiving (402) a first measurement (320) of power supplied to a computer system by a first power supply may be carried out by a power meter on the first power supply measuring the output of the first power supply to the computer system. A controller (208) on the first power supply or external to the first power supply may retrieve the first measurement (320) from the power meter.

The method of FIG. 4 further includes receiving (404) a second measurement (322) of power supplied to the computer system by a second power supply. Receiving (404) a second measurement (322) of power supplied to the computer system by a second power supply may be carried out by a power meter on the second power supply measuring the output of the second power supply to the computer system. The controller (208) may retrieve the second measurement (322) from a controller on the second power supply or directly from the power meter on the second power supply.

The method of FIG. 4 further includes calculating (406) a total power supplied to the computer system by combining the first measurement (320) of power supplied to the computer system by the first power supply and the second measurement (322) of power supplied to the computer system by the second power supply. Calculating (406) a total power supplied to the computer system by combining the first measurement of power supplied to the computer system by the first power supply and the second measurement of power supplied to the computer system by the second power supply may be carried out by the controller (208) adding the first measurement (320) to the second measurement (322) (and power measurements from any additional power supplies) to obtain the total power supplied to the computer system. The total power supplied to the computer system may include the amount of power provided by all power supplies providing power to the computer system.

For example, assume that power is supplied to a computer system using two power supplies. If the first measurement (320) of power supplied to the computer system by the first power supply is 500 watts, and the second measurement (322) of power supplied to the computer system by the second power supply is also 500 watts, then the total power supplied to the computer system would be 1000 watts.

The method of FIG. 4 further includes comparing (408) the total power supplied to the computer system to a power threshold of the computer system, wherein the power threshold of the computer system is a maximum amount of power the computer system draws before damage to the computer system occurs. Comparing (408) the total power supplied to the computer system to a power threshold of the computer system, wherein the power threshold of the computer system is a maximum amount of power the computer system draws before damage to the computer system occurs may be carried out by the controller (208) retrieving a power threshold for the computer system. The controller (208) may receive the power threshold by querying the computer system for the power threshold. Alternatively, the computer system or other mechanism may program the controller (208) with the power threshold.

Comparing (408) the total power supplied to the computer system to a power threshold of the computer system may also be carried out by determining whether the total power supplied is less than the power threshold of the computer system or whether the total power supplied exceeds the power threshold of the computer system.

The method of FIG. 4 further includes, in response to determining that the total power supplied exceeds the power threshold of the computer system, shutting (410) off the first power supply. Determining that the total power supplied exceeds the power threshold of the computer system may be carried out by the controller (208) in response to the comparing the total power supplied to the computer system to a power threshold of the computer system. The controller (208) may determine that the total amount of power supplied to the computer system by all power supplies is greater than the power threshold of the computer system.

For example, the controller (208) may receive a first measurement of 200 watts supplied by a first power supply, a second measurement of 200 watts supplied by a second power supply, and a third measurement of 200 watts supplied by a third power supply. The controller (208) may also be programmed with a power threshold of 500 watts for the computer system. The controller (208) would calculate the total power supplied to the computer system (300 watts+300 watts+300 watts=600 watts), compare the total power supplied to the computer system to the power threshold, and determine that the total power supplied to the computer system (600 watts) exceeds the power threshold of the computer system (500 watts).

Shutting (410) off the first power supply may be carried out by ceasing to provide power to the computer system by the first power supply. The controller (208) may send a signal to a shutoff mechanism in the first power supply. In response, the shutoff mechanism may deactivate a connection to the computer system providing power to the computer system by the first power supply.

The steps described above improve the operation of a computer system by tracking total power supplied to a computer system by each power supply using a controller within or directly coupled to each power supply. Typical power supplies may only monitor the power supplied to the computer system by that power supply. The computer system itself may include elements to monitor power intake, but reaction by those elements may not be fast enough to prevent damage to the system. The claims above describe a controller within or directly coupled to the power supplies that monitors the total power supplied to the computer system by all power supplies (Steps 402 and 404) and is able to respond immediately if the total power supplied exceeds the power threshold of the computer system (Steps 406 and 408). The immediate response comes in the form of shutting off at least one power supply (Step 410).

Figure 5:
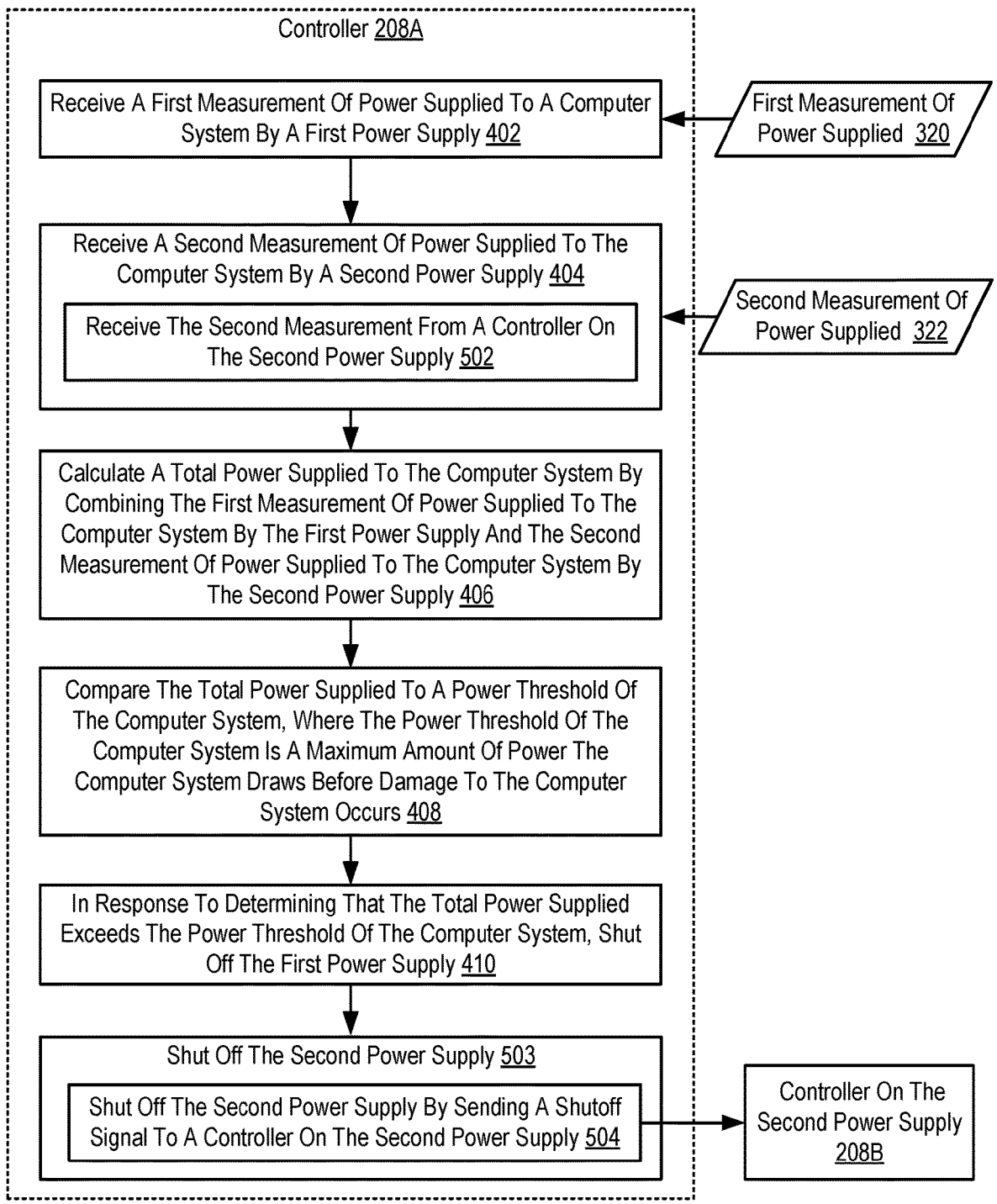
FIG. 5 sets forth a flow chart illustrating an exemplary method for power control for computer systems with multiple power supplies according to embodiments of the present invention.

For further explanation, FIG. 5 sets forth a flow chart illustrating a further exemplary method for power control for computer systems with multiple power supplies according to embodiments of the present invention. Specifically, FIG. 5 includes steps describing power control for computer systems with multiple power supplies for a system such as the system described in FIG. 2 in which the first power supply and the second power supply each include a controller. The method of FIG. 5 includes receiving (402) a first measurement (320) of power supplied to a computer system by a first power supply; receiving (404) a second measurement (322) of power supplied to the computer system by a second power supply; calculating (406) a total power supplied to the computer system by combining the first measurement of power supplied to the computer system by the first power supply and the second measurement of power supplied to the computer system by the second power supply; comparing (408) the total power supplied to the computer system to a power threshold of the computer system, wherein the power threshold of the computer system is a maximum amount of power the computer system draws before damage to the computer system occurs; and in response to determining that the total power supplied exceeds the power threshold of the computer system, shutting (410) off the first power supply.

The method of FIG. 5 differs from the method of FIG. 4, however, in that receiving (404) a second measurement (322) of power supplied to the computer system by a second power supply includes receiving (502) the second measurement from a controller on the second power supply. Receiving (502) the second measurement from a controller on the second power supply may be carried out by a controller (208A) on the first power supply retrieving or requesting, from the controller (208B) on the second power supply, the second measurement (322).

The method of FIG. 5 further differs from the method of FIG. 4 in that the method of FIG. 5 further includes shutting (503) off the second power supply by sending (504) a shutoff signal to a controller (208B) on the second power supply. Shutting (503) off the second power supply by sending (504) a shutoff signal to a controller (208B) on the second power supply may be carried out by the controller (208A) on the first power supply generating a shutoff signal and sending the shutoff signal to the controller (208B) on the second power supply. The controller (208B) on the second power supply may, in response, send a shutoff signal to a shutoff mechanism on the second power supply.

Figure 6:
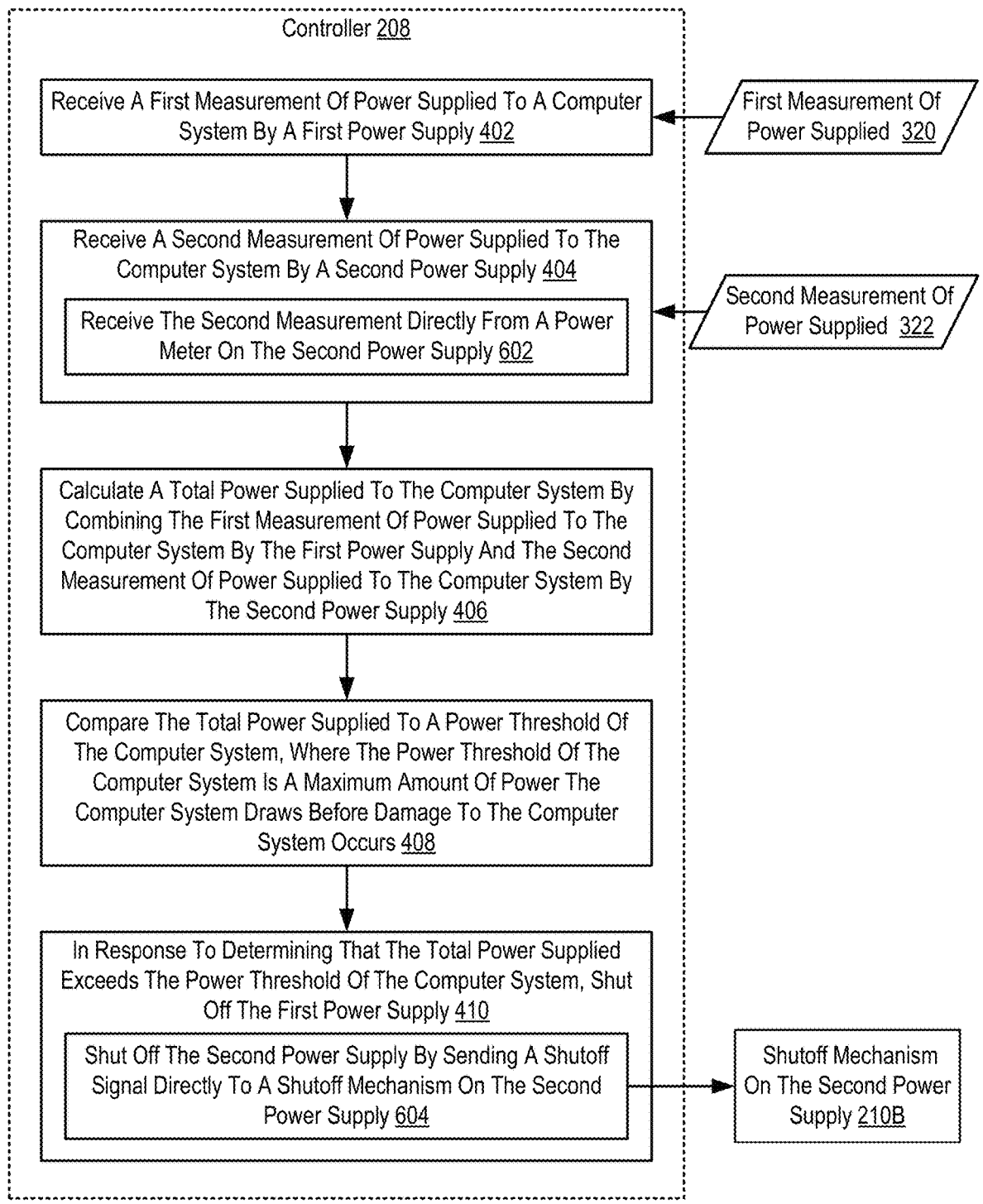
FIG. 6 sets forth a flow chart illustrating an exemplary method for power control for computer systems with multiple power supplies according to embodiments of the present invention.

For further explanation, FIG. 6 sets forth a flow chart illustrating a further exemplary method for power control for computer systems with multiple power supplies according to embodiments of the present invention. Specifically, FIG. 6 includes steps describing power control for computer systems with multiple power supplies for a system such as the system described in FIG. 3 in which a single controller is directly coupled to elements within the first power supply and the second power supply. The method of FIG. 6 includes receiving (402) a first measurement (320) of power supplied to a computer system by a first power supply; receiving (404) a second measurement (322) of power supplied to the computer system by a second power supply; calculating (406) a total power supplied to the computer system by combining the first measurement of power supplied to the computer system by the first power supply and the second measurement of power supplied to the computer system by the second power supply; comparing (408) the total power supplied to the computer system to a power threshold of the computer system, wherein the power threshold of the computer system is a maximum amount of power the computer system draws before damage to the computer system occurs; and in response to determining that the total power supplied exceeds the power threshold of the computer system, shutting (410) off the first power supply.

The method of FIG. 6 differs from the method of FIG. 4, however, in that receiving (404) a second measurement (322) of power supplied to the computer system by a second power supply includes receiving (602) the second measurement directly from a power meter on the second power supply. Receiving (602) the second measurement directly from a power meter on the second power supply may be carried out by the controller (208) retrieving or requesting the second measurement (322) directly from the power meter on the second power supply without interacting with another controller.

The method of FIG. 6 further differs from the method of FIG. 4 in that, in response to determining that the total power supplied exceeds the power threshold of the computer system, shutting (410) off the first power supply further includes shutting (604) off the second power supply by sending a shutoff signal directly to a shutoff mechanism (210B) on the second power supply. Shutting (604) off the second power supply by sending a shutoff signal directly to a shutoff mechanism (210B) on the second power supply may be carried out by the controller (208) generating a shutoff signal and sending the shutoff signal to the shutoff mechanism on the second power supply without interacting with another controller.

Figure 7:
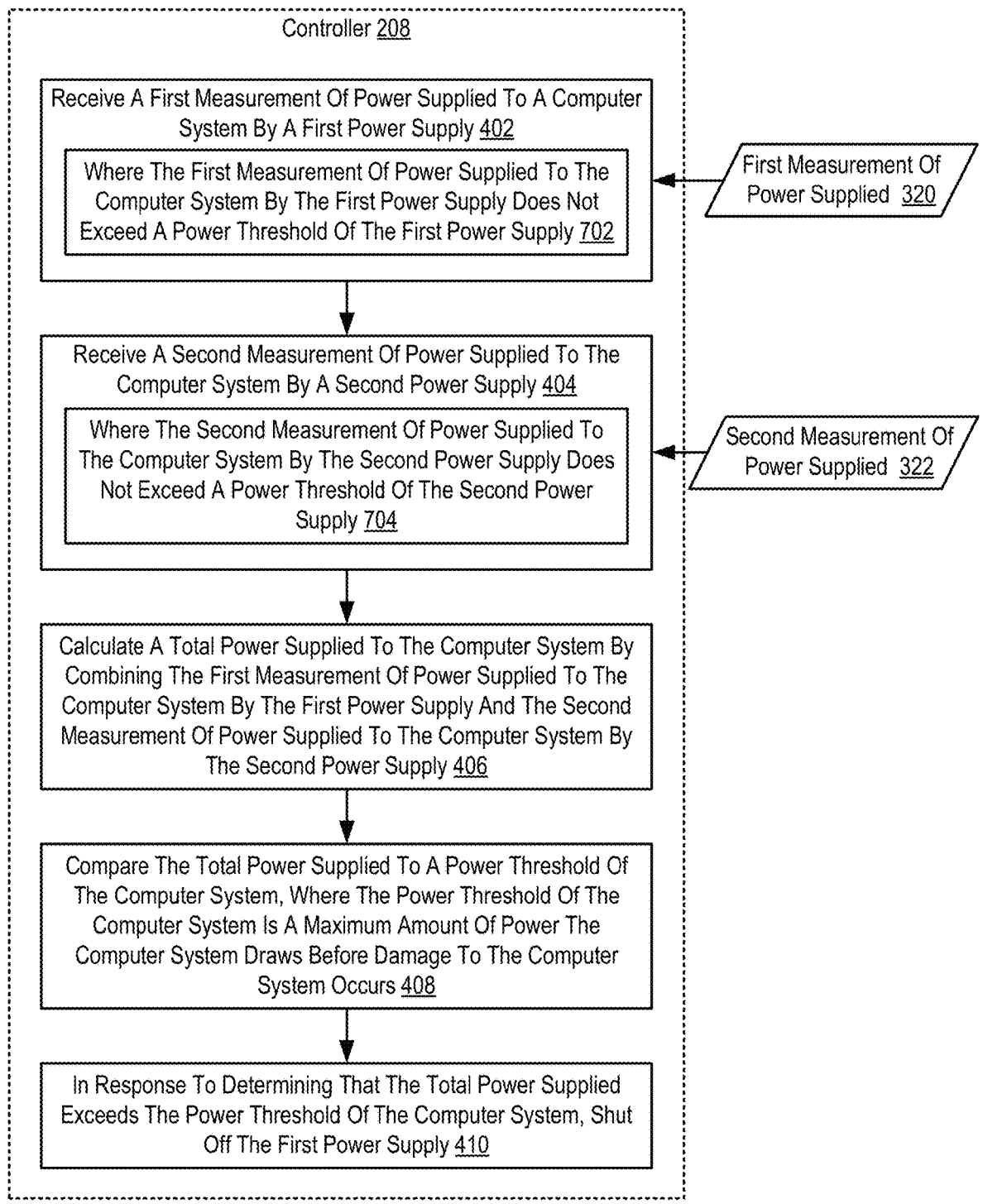
FIG. 7 sets forth a flow chart illustrating an exemplary method for power control for computer systems with multiple power supplies according to embodiments of the present invention.

For further explanation, FIG. 7 sets forth a flow chart illustrating a further exemplary method for power control for computer systems with multiple power supplies according to embodiments of the present invention that includes receiving (402) a first measurement (320) of power supplied to a computer system by a first power supply; receiving (404) a second measurement (322) of power supplied to the computer system by a second power supply; calculating (406) a total power supplied to the computer system by combining the first measurement of power supplied to the computer system by the first power supply and the second measurement of power supplied to the computer system by the second power supply; comparing (408) the total power supplied to the computer system to a power threshold of the computer system, wherein the power threshold of the computer system is a maximum amount of power the computer system draws before damage to the computer system occurs; and in response to determining that the total power supplied exceeds the power threshold of the computer system, shutting (410) off the first power supply.

The method of FIG. 7 differs from the method of FIG. 4, however, in that receiving (402) a first measurement (320) of power supplied to a computer system by a first power supply includes wherein (702) the first measurement of power supplied to the computer system by the first power supply does not exceed a power threshold of the first power supply. The method of FIG. 7 also differs from the method of FIG. 4 in that receiving (404) a second measurement (322) of power supplied to the computer system by a second power supply includes wherein (704) the second measurement of power supplied to the computer system by the second power supply does not exceed a power threshold of the second power supply.

Each power supply may be associated with a power threshold describing the amount of power the power supply may draw from a power source before damage to the power supply occurs. Each power supply may have a mechanism to take action on the power supply if the power threshold of the power supply is exceeded. However, the power threshold of the computer system may be exceeded even if the power thresholds of each individual power supply is not exceeded.

For example, a first power supply may have a power threshold of 600 watts and a second power supply may have a power threshold of 1000 watts. Both power supplies may supply power to a computer system with a power threshold of 1200 watts. Assume that the first power supply provides 500 watts of power to the computer system and the second power supply provides 800 watts of power to the computer system. The first power supply is not exceeding the power threshold of the first power supply (500 watts is below the power threshold of 600 watts). The second power supply is not exceeding the power threshold of the second power supply (800 watts is below the power threshold of 1000 watts). However, the total power supplied by both power supplies (500 watts+800 watts=1300 watts) exceeds the power threshold (1200 watts) of the computer system.

Although FIGS. 2-7 describe the system primarily using two power supplies, the system may include more than two power supplies using the same or similar structures and methods.

In view of the explanations set forth above, readers will recognize that the benefits of power control for computer systems with multiple power supplies according to embodiments of the present invention include:

Improving the operation of a computing system by including controllers aware of the power supplied by each power supply providing power to the computer system, reducing damage caused by overpowering a computer system, increasing computing system safety and reliability.

Improving the operation of a computing system by monitoring total power supplied to a computer system by elements within or directly attached to the power supplies, decreasing latency for action taken in the event of too much power supplied to a computer system, increasing computing system safety and reliability.

Exemplary embodiments of the present invention are described largely in the context of a fully functional computer system for power control for computer systems with multiple power supplies. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a computing device,
receiving a first measurement of power supplied to a computer system by a first power supply;
receiving a second measurement of power supplied to the computer system by a second power supply;
calculating a total power supplied to the computer system by combining the first measurement of power supplied to the computer system by the first power supply and the second measurement of power supplied to the computer system by the second power supply;
comparing, by a controller on the first power supply, the total power supplied to the computer system to a power threshold of the computer system, wherein the power threshold of the computer system is a maximum amount of power the computer system draws before damage to the computer system occurs; and
in response to determining that the total power supplied exceeds the power threshold of the computer system, shutting off the first power supply.

2. The method of claim 1, further comprising:
in response to determining that the total power supplied exceeds the power threshold of the computer system, shutting off the second power supply.

3. The method of claim 2, wherein shutting off the second power supply comprises sending a shutoff signal to a controller on the second power supply.

4. The method of claim 2, wherein shutting off the second power supply comprises sending a shutoff signal directly to a shutoff mechanism on the second power supply.

5. The method of claim 1, wherein the first measurement of power supplied to the computer system by the first power supply does not exceed a power threshold of the first power supply, and wherein the second measurement of power supplied to the computer system by the second power supply does not exceed a power threshold of the second power supply.

6. The method of claim 1, wherein receiving the second measurement of power supplied to the computer system by the second power supply comprises receiving the second measurement from a controller on the second power supply; and wherein the determination that the total power supplied exceeds the power threshold of the computer system is carried out by the controller on the first power supply.

7. The method of claim 1, wherein receiving the second measurement of power supplied to the computer system by the second power supply comprises receiving the second measurement directly from a power meter on the second power supply.

8. An apparatus comprising computer program instructions that, when executed, cause the apparatus to carry out the steps of:

receiving a first measurement of power supplied to a computer system by a first power supply;

receiving a second measurement of power supplied to the computer system by a second power supply;

calculating a total power supplied to the computer system by combining the first measurement of power supplied to the computer system by the first power supply and the second measurement of power supplied to the computer system by the second power supply;

comparing, by a controller on the first power supply, the total power supplied to the computer system to a power threshold of the computer system, wherein the power threshold of the computer system is a maximum amount of power the computer system draws before damage to the computer system occurs; and in response to determining that the total power supplied exceeds the power threshold of the computer system, shutting off the first power supply.

9. The apparatus of claim 8, wherein the apparatus further carries out the steps of:

in response to determining that the total power supplied exceeds the power threshold of the computer system, shutting off the second power supply.

10. The apparatus of claim 9, wherein shutting off the second power supply comprises sending a shutoff signal to a controller on the second power supply.

11. The apparatus of claim 9, wherein shutting off the second power supply comprises sending a shutoff signal directly to a shutoff mechanism on the second power supply.

12. The apparatus of claim 8, wherein the first measurement of power supplied to the computer system by the first power supply does not exceed a power threshold of the first power supply, and wherein the second measurement of power supplied to the computer system by the second power supply does not exceed a power threshold of the second power supply.

13. The apparatus of claim 8, wherein receiving the second measurement of power supplied to the computer system by the second power supply comprises receiving the second measurement from a controller on the second power supply; and wherein the determination that the total power supplied exceeds the power threshold of the computer system is carried out by the controller on the first power supply.

14. The apparatus of claim 8, wherein receiving the second measurement of power supplied to the computer system by the second power supply comprises receiving the second measurement directly from a power meter on the second power supply.

15. A computer program product including a computer readable medium, the computer program product comprising computer program instructions that, when executed, cause a computer to carry out the steps of:

receiving a first measurement of power supplied to a computer system by a first power supply;

receiving a second measurement of power supplied to the computer system by a second power supply;

calculating a total power supplied to the computer system by combining the first measurement of power supplied to the computer system by the first power supply and the second measurement of power supplied to the computer system by the second power supply;

comparing, by a controller on the first power supply, the total power supplied to the computer system to a power threshold of the computer system, wherein the power threshold of the computer system is a maximum amount of power the computer system draws before damage to the computer system occurs; and in response to determining that the total power supplied exceeds the power threshold of the computer system, shutting off the first power supply.

16. The computer program product of claim 15, wherein the computer program instructions further cause the computer to carry out the steps of:

in response to determining that the total power supplied exceeds the power threshold of the computer system, shutting off the second power supply.

17. The computer program product of claim 16, wherein shutting off the second power supply comprises sending a shutoff signal to a controller on the second power supply.

18. The computer program product of claim 16, wherein shutting off the second power supply comprises sending a shutoff signal directly to a shutoff mechanism on the second power supply.

19. The computer program product of claim 15, wherein the first measurement of power supplied to the computer system by the first power supply does not exceed a power threshold of the first power supply, and wherein the second measurement of power supplied to the computer system by the second power supply does not exceed a power threshold of the second power supply.

20. The computer program product of claim 15, wherein receiving the second measurement of power supplied to the computer system by the second power supply comprises receiving the second measurement from a controller on the second power supply; and wherein the determination that the total power supplied exceeds the power threshold of the computer system is carried out by the controller on the first power supply.

* * * * *